US009813183B2

(12) United States Patent
Nakamura et al.

(10) Patent No.: US 9,813,183 B2
(45) Date of Patent: Nov. 7, 2017

(54) OPTICAL TRANSMISSION DEVICE AND OPTICAL TRANSMISSION SYSTEM

(71) Applicant: FUJITSU LIMITED, Kawasaki-shi, Kanagawa (JP)

(72) Inventors: Kentaro Nakamura, Machida (JP); Yoshito Kachita, Kawasaki (JP); Satoru Okano, Yokohama (JP); Yusaku Yamamoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/848,718

(22) Filed: Sep. 9, 2015

(65) Prior Publication Data

US 2016/0094307 A1    Mar. 31, 2016

(30) Foreign Application Priority Data

Sep. 30, 2014    (JP) ................................. 2014-201349

(51) Int. Cl.
| | | |
|---|---|---|
| *H04B 10/08* | (2006.01) | |
| *H04J 14/02* | (2006.01) | |
| *H04B 10/294* | (2013.01) | |
| *H01S 3/067* | (2006.01) | |
| *H01S 3/16* | (2006.01) | |
| *H04B 10/079* | (2013.01) | |
| *H01S 3/13* | (2006.01) | |

(52) U.S. Cl.
CPC ...... *H04J 14/0221* (2013.01); *H04B 10/2942* (2013.01); *H01S 3/06754* (2013.01); *H01S 3/1301* (2013.01); *H01S 3/1608* (2013.01); *H04B 10/07953* (2013.01); *H04B 10/07955* (2013.01)

(58) Field of Classification Search
CPC ............ H04J 14/0221; H04B 10/2942; H04B 10/07953; H04B 10/0777; H04B 10/0795; H04B 10/0797; H04B 10/0731; H04B 10/07955; H01S 3/06754; H01S 3/1301; H01S 3/1608
USPC ...... 398/26, 33, 37, 177; 359/337.1, 337.12, 359/341.3, 341.33, 341.41, 341.42
See application file for complete search history.

(56) References Cited

U.S. PATENT DOCUMENTS

| | | | |
|---|---|---|---|
| 6,594,071 B1 * | 7/2003 | Gavrilovic | ......... H01S 3/06754 359/341.4 |
| 2002/0126353 A1 * | 9/2002 | Iwata | .................. H04J 14/0221 398/83 |
| 2004/0175180 A1 | 9/2004 | Sugaya | |

(Continued)

FOREIGN PATENT DOCUMENTS

| | | |
|---|---|---|
| JP | 2000-183854 | 6/2000 |
| JP | 2001-015845 | 1/2001 |
| JP | 2010-124266 | 6/2010 |

*Primary Examiner* — M. R. Sedighian
(74) *Attorney, Agent, or Firm* — Staas & Halsey LLP (57) ABSTRACT

An optical transmission device includes a reception unit that receives a first signal light and a second signal light, the first and second lights having power levels that respectively correspond to transmission distances and being transmitted; an amplification unit that amplifies the first signal light and the second signal light in accordance with a signal light having a high power level from among the received first signal light and second signal light; and a transmission unit that performs transmission of the amplified first signal light and second signal light.

7 Claims, 12 Drawing Sheets

(56) References Cited

U.S. PATENT DOCUMENTS

2012/0269506 A1* 10/2012 Vassilieva ............ H04J 14/0221
398/26

* cited by examiner

|  | ch1 | ch2 | ch3 | ch4 | ch5 | ch6 |
|---|---|---|---|---|---|---|
| INPUT POWER VALUE | −19 dBm | −17 dBm | −19 dBm | −19 dBm | −19 dBm | −17 dBm |
| GROUP | GROUP 1 | GROUP 2 | GROUP 1 | GROUP 1 | GROUP 1 | GROUP 2 |
| TARGET POWER VALUE |  | +1 dBm |  |  |  | +1 dBm |
| GAIN SETTING VALUE | 18 dB | | | | | |

OPTICAL TRANSMISSION DEVICE AND OPTICAL TRANSMISSION SYSTEM

CROSS-REFERENCE TO RELATED APPLICATION

This application is based upon and claims the benefit of priority of the prior Japanese Patent Application No. 2014-201349, filed on Sep. 30, 2014, the entire contents of which are incorporated herein by reference.

FIELD

The embodiments discussed herein are related to an optical transmission device and an optical transmission system.

BACKGROUND

In the related art, in an optical transmission system, an optical transmission device (hereinafter also referred to as node) that transmits and receives signal lights through a transmission path includes an optical amplifier in order to compensate loss in the transmission path. In the optical transmission system, optical wavelength division multiplexing (WDM) transmission has been typically performed, and an erbium-doped fiber amplifier (EDFA) has been widely used as the optical amplifier of the optical transmission device.

The EDFA may amplify a multiplexed light as is, which has been obtained by multiplexing signal lights with a 1530 to 1565 nm band (C-Band) or signal lights with a 1565 to 1625 nm band (L-Band). In addition, the EDFA amplifies the respective wavelengths in the multiplexed light uniformly, and controls the amplification based on the average power of the respective wavelengths.

Japanese Laid-open Patent Publication No. 2000-183854, and Japanese Laid-open Patent Publication No. 2001-15845 are the related arts.

SUMMARY

According to an aspect of the invention, an optical transmission device includes a reception unit that receives a first signal light and a second signal light, the first and second lights having power levels that respectively correspond to transmission distances and being transmitted; an amplification unit that amplifies the first signal light and the second signal light in accordance with a signal light having a high power level from among the received first signal light and second signal light; and a transmission unit that performs transmission of the amplified first signal light and second signal light.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the optical transmission system, output of the EDFA in each optical transmission device has increased because of a desire for longer distances and larger capacity in the transmission in order to improve an optical signal-to-noise ratio (OSNR) at the time of transmission and reception.

When output of the EDFA in each optical transmission device increases, a power difference occurs between a signal light from an optical transmission device that corresponds to high output and a signal light from an optical transmission device that does not correspond to high output. In addition, through a transmission path, a multiplexed light is transmitted in which a signal light having high power from the optical transmission device that corresponds to high output and a signal light having low power from the optical transmission device that does not correspond to high output are mixed.

Figure 15:
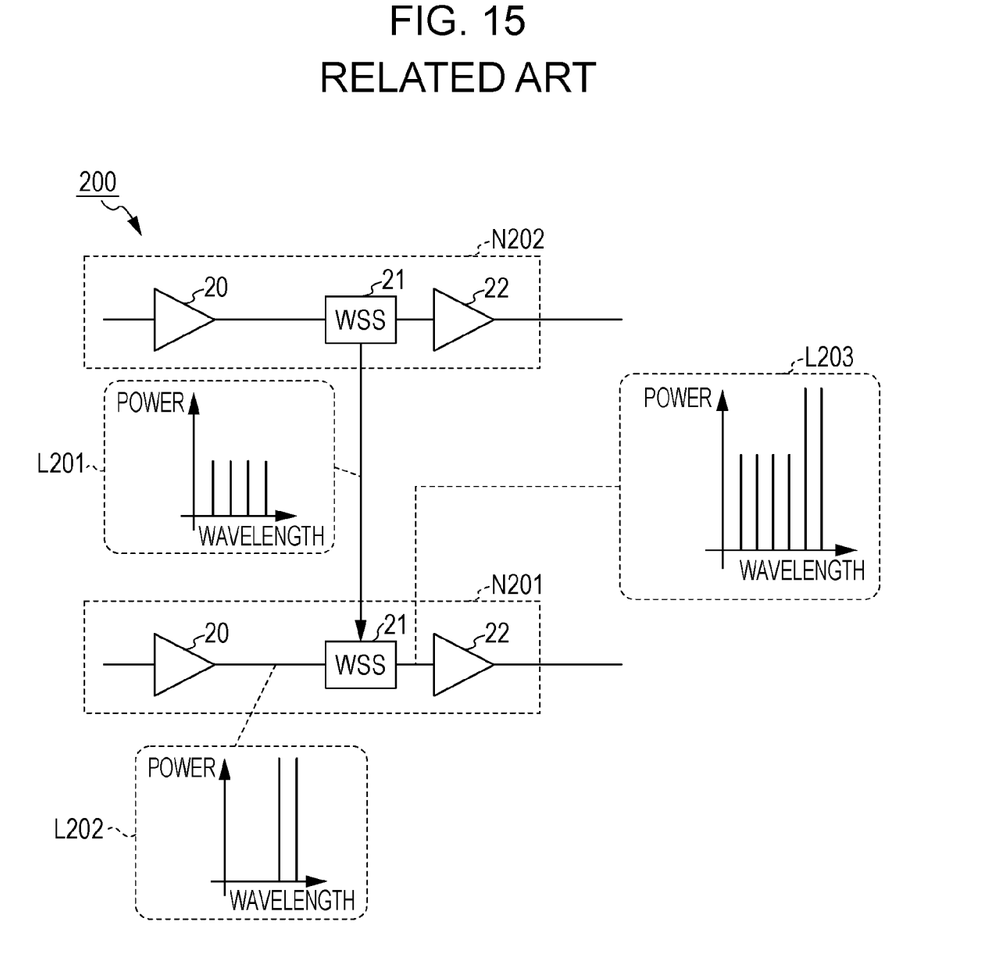
FIG. 15 is a diagram illustrating signal lights having different power.

FIG. 15 is a diagram illustrating signal lights having different levels of power. As illustrated in FIG. 15, an optical transmission system 200 performs transmission and reception of a multiplexed light that has been obtained by applying wavelength multiplexing to signal lights, through nodes N201 and N202. Each of the nodes N201 and N202 includes a first amplification unit 20 that amplifies an input multiplexed light, a wavelength selective switch (WSS) 21 that switches the path setting for each of the wavelengths, and a second amplification unit 22 that amplifies the multiplexed light that has been output from the WSS 21.

Here, it is assumed that the node N201 corresponds to a high output, and the node N202 does not correspond to a high output. In addition, it is assumed that a signal light L201 the path of which has been switched by the WSS 21 of the node N202 is input to the WSS 21 of the node N201, and is multiplexed with a signal light L202 that has been amplified in the first amplification unit 20 of the node N201. In this case, the node N201 corresponds to a high output, and the node N202 does not correspond to a high output, so that the power of the signal light L202 becomes higher than that of the signal light L201. Therefore, a signal light L203 output from the WSS 21 of the node N201 is a multiplexed light in which the signal light having high power and the signal light having low power are mixed, and is amplified in the second amplification unit 22.

When a multiplexed light in which a signal light having a high power and a signal light having a low power are mixed is amplified based on the average power of the respective wavelengths in each optical transmission device, signal degradation may occur.

For example, when the number of signal lights having a low power is large in the multiplexed light, then the average power use will be low, so that the multiplexed light is amplified so that the average power is increased. Therefore, when the starting power of a signal light is high, it may be needlessly increased, a non-linear effect affects the signal light in the transmission path significantly, and the signal light is degraded.

It is desired to reduce degradation of a plurality of signal lights to be transmitted.

An optical transmission device and an optical transmission system according to embodiments are described below with reference to drawings. The same symbol is assigned to configurations having an identical function in the embodiments, and repeated description is omitted herein. The optical transmission device and the optical transmission system described in the embodiment are just examples, and the optical transmission device and the optical transmission system discussed herein are not limited to the embodiments. In addition, the embodiments may be combined as appropriate within a range in which the embodiments do not contradict each other.

First Embodiment

Figure 1:
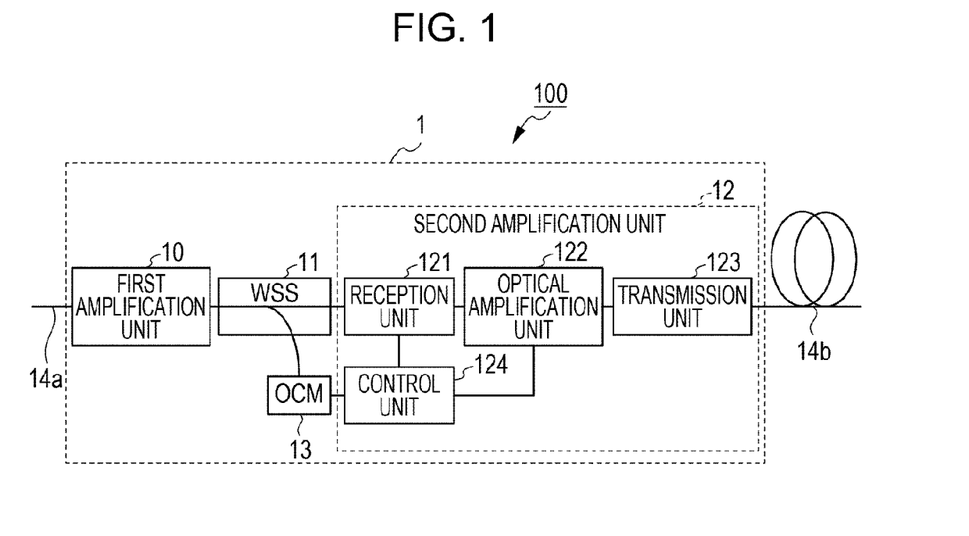
FIG. 1 is a block diagram illustrating a configuration example of an optical transmission system according to a first embodiment.

FIG. 1 is a block diagram illustrating a configuration example of an optical transmission system 100 according to a first embodiment. As illustrated in FIG. 1, the optical transmission system 100 includes an optical transmission device 1 that transmits and receives a multiplexed light that has been obtained by applying wavelength multiplexing to signal lights of respective wavelengths, through optical transmission paths 14a and 14b such as an optical fiber. In the optical transmission system 100, the optical transmission device 1 is a terminal (terminal, relay station, or the like to which an optical signal is input) that constitutes an optical communication network using the optical transmission paths 14a and 14b, and is also a node in the network.

The optical transmission device 1 includes a first amplification unit 10, a WSS 11, a second amplification unit 12, and an optical channel monitor (OCM) 13. The first amplification unit 10 is an EDFA or the like, and amplifies a multiplexed light that has been input from the optical transmission path 14a, and outputs the amplified multiplexed light to the WSS 11. Due to such amplification in the first amplification unit 10, for example, a loss portion in the WSS 11 is compensated.

The WSS 11 switches path setting for signal lights of the respective wavelengths included in the multiplexed light. For example, the WSS 11 functions as an optical add-drop multiplexer (OADM) that executes add and drop processing for the signal lights that correspond to certain wavelengths. The WSS 11 includes a coupler and the like, and outputs the multiplexed light after switching, to the second amplification unit 12 and the OCM 13.

The second amplification unit 12 amplifies the multiplexed light that has been output from the WSS 11, and outputs the amplified multiplexed light to the optical transmission path 14b. The OCM 13 is an optical spectrum analyzer or the like, and monitors the power of each of the signal lights to which wavelength multiplexing has been applied, for the multiplexed light that has been output from the WSS 11. The OCM 13 notifies the second amplification unit 12 of the power values of the respective signal lights (input power values).

The second amplification unit 12 includes a reception unit 121, an optical amplification unit 122, a transmission unit 123, and a control unit 124. The reception unit 121 receives the multiplexed light that has been output from the WSS 11, and outputs the received multiplexed light to the optical amplification unit 122. The optical amplification unit 122 is an EDFA or the like including an erbium-doped fiber (EDF) and a variable optical attenuator (VOA), and amplifies the input multiplexed light based on the control of the control unit 124. The optical amplification unit 122 outputs the amplified multiplexed light to the transmission unit 123. The transmission unit 123 transmits the multiplexed light that has been amplified in the optical amplification unit 122, to the optical transmission path 14b.

The control unit 124 controls the operation of the second amplification unit 12. For example, the control unit 124 controls gain of the amplification of the multiplexed light by controlling the control to the optical amplification unit 122 based on the power values (input power values) of the signal lights, which have been notified by the OCM 13. For example, the control unit 124 performs gain varying so that loss in the VOA is increased by 1 db when gain in the optical amplification unit 122 is decreased by 1 db. As described above, the control unit 124 controls the gain assigned to the multiplexed light in the optical amplification unit 122.

Figure 2:
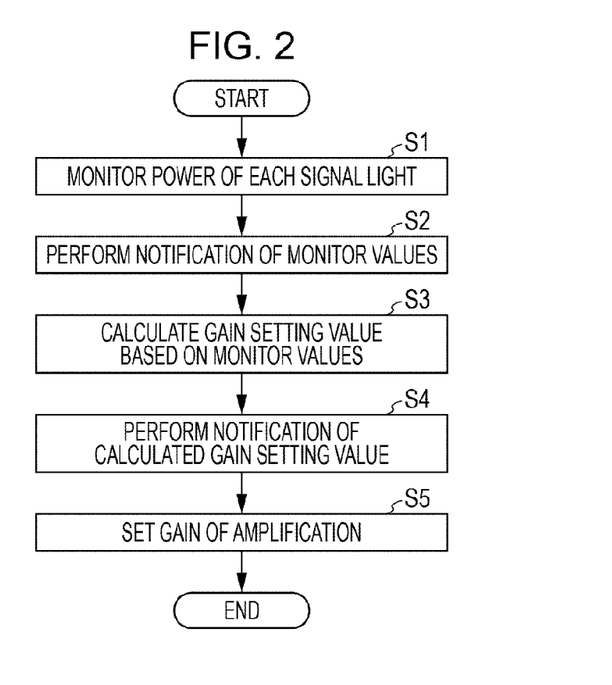
FIG. 2 is a flowchart illustrating an operation example of an optical transmission device according to the first embodiment.

An operation of the optical transmission device 1 is described below. FIG. 2 is a flowchart illustrating an operation example of the optical transmission device 1 according to the first embodiment.

As illustrated in FIG. 2, when the processing starts due to power application or the like, the OCM 13 of the optical transmission device 1 monitors the power of each of the signal lights to which wavelength multiplexing has been applied (S1). After that, the OCM 13 notifies the control unit 124 of the power values of the signal lights (input power values), which have been obtained by the monitoring, as monitor values (S2).

The control unit 124 calculates, based on the notified monitor values, a gain setting value that is a setting value for gain when the optical amplification unit 122 amplifies the multiplexed light (S3). For example, the control unit 124 calculates, based on the notified monitor values, a gain setting value that corresponds to a signal light having a high power level, from among the signal lights included in the multiplexed light, to which wavelength multiplexing has been applied. After that, the control unit 124 notifies the optical amplification unit 122 of the set gain setting value (S4), and sets the gain of the amplification in the optical amplification unit 122 (S5).

Each of the signal lights included in the multiplexed light is transmitted with a power level that corresponds to a transmission distance. For example, it is highly probable that a signal light input having high power is amplified by an EDFA that corresponds to high output power, and is used for long-distance transmission. In addition, it is highly probable that a signal light input having low power is amplified not by the EDFA that corresponds to high output power, but by a regular EDFA, and is used for short-medium distance transmission.

The control unit 124 determines a power level of each of the signal lights by comparing the power in the notified monitor value for each of the signal lights with a threshold value that has been set in a memory or the like in advance. For example, when the power value in the notified monitor value of the signal light is higher than the threshold value that has been set in advance, the control unit 124 determines that the signal light has a high power level, and when the power value in the notified monitor value of the signal light is lower than the threshold, the control unit 124 determines that the signal light has a low power level. In addition, the control unit 124 calculates a gain setting value so that the power value of the signal light having the high power level is set as a target power value that has been set in the memory or the like in advance.

Figure 3:
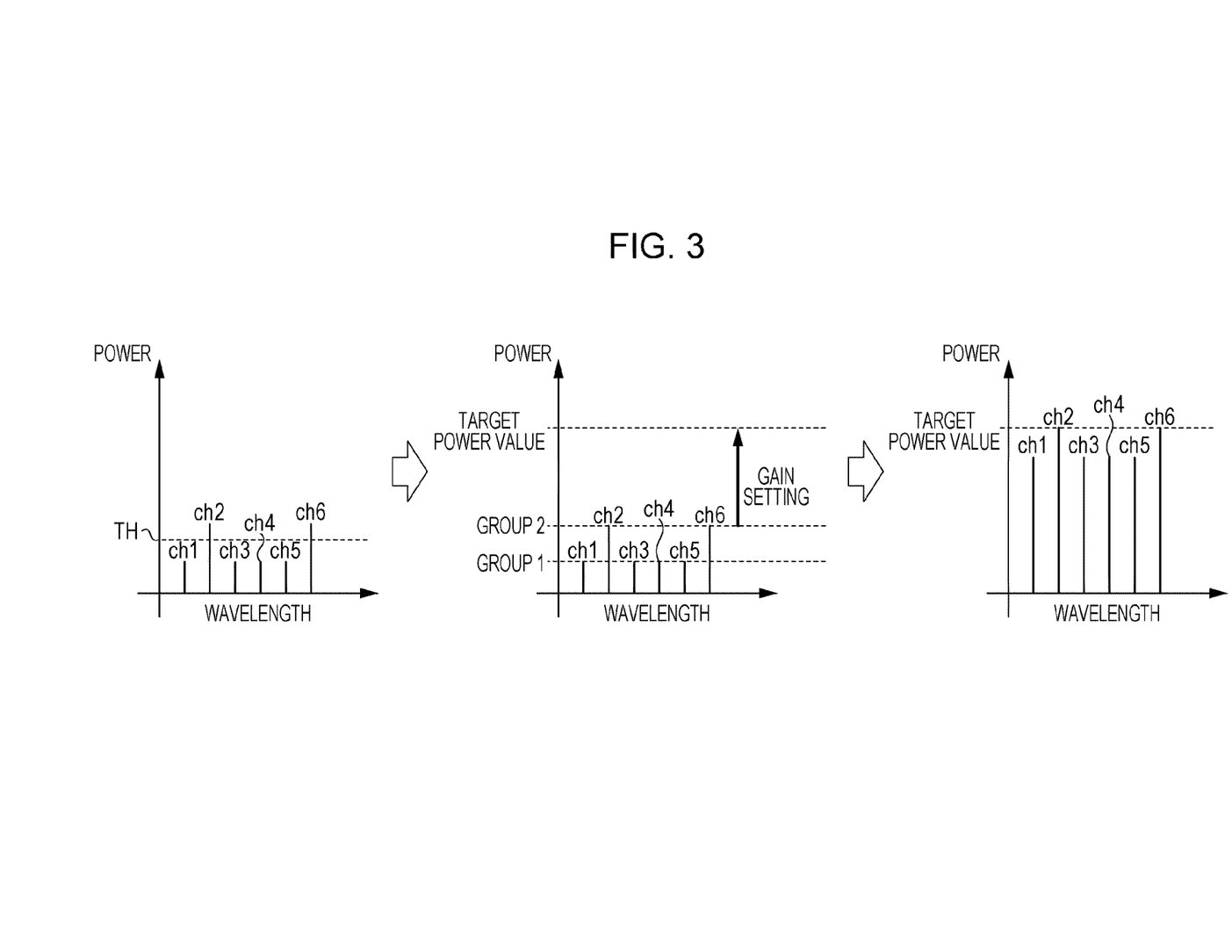
FIG. 3 is a diagram illustrating amplification of signal lights in the first embodiment.

FIG. 3 is a diagram illustrating amplification of signal lights in the first embodiment. As illustrated in FIG. 3, it is assumed that the control unit 124 amplifies signal lights ch1 to ch6 included in a multiplexed light, to which wavelength multiplexing has been applied.

The control unit 124 determines whether a signal light has a high power level by comparing the power values of the signal lights ch1 to ch6 with a threshold value TH. In the illustrated example, due to the comparison of the signal lights with the threshold value TH, the signal lights ch2 and ch6 are determined as signal lights having a high power level. After that, the control unit 124 calculates a gain setting value so that the power values of the signal lights ch2 and ch6, the power levels of which have been determined to be high, are set as a target power value.

Figure 4:
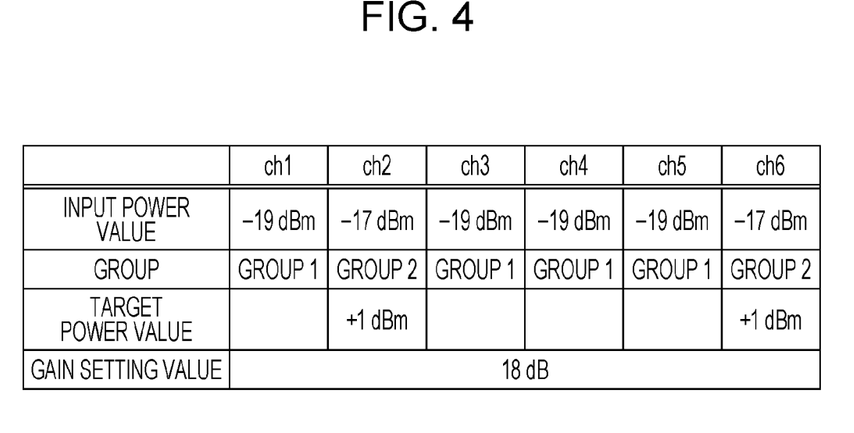
FIG. 4 is a diagram illustrating calculation of a gain setting value in the first embodiment.

FIG. 4 is a diagram illustrating calculation of a gain setting value in the first embodiment. As illustrated in FIG. 4, it is assumed that input power values of the signal lights ch1 to ch6 are respectively −19 dBm, −17 dBm, −19 dBm, −19 dBm, −19 dBm, and −17 dBm. Due to the above-described power level determination, the signal lights ch1, and ch3 to ch5 are classified into "group 1" of signal lights having a low power level, and the signal lights ch2 and ch6 are classified into "group 2" of signal lights having a high power level.

Here, it is assumed that "+1 dBm" is set as a target power value of the signal light having the high power level in advance in accordance with transmission design. The target power value in accordance with such transmission design is set at a certain value within a range in which the signal light having the high power level is not significantly affected by the non-linear effect in the optical transmission path 14b. The power value in "group 2" of the signal lights having the high power level is "−17 dBm", so that the control unit 124 calculates "18 dB" as a gain setting value based on a difference (+1−(−17)=18) with "+1 dBm" that is the target power value.

Such a calculated gain setting value is sent to the optical amplification unit 122, and the multiplexed light in which the power values of the signal lights ch2 and ch6, the power levels of which are high, are set as the target power value may be amplified in the optical transmission device 1 by controlling the optical amplification unit 122 through the control unit 124.

Figure 5:
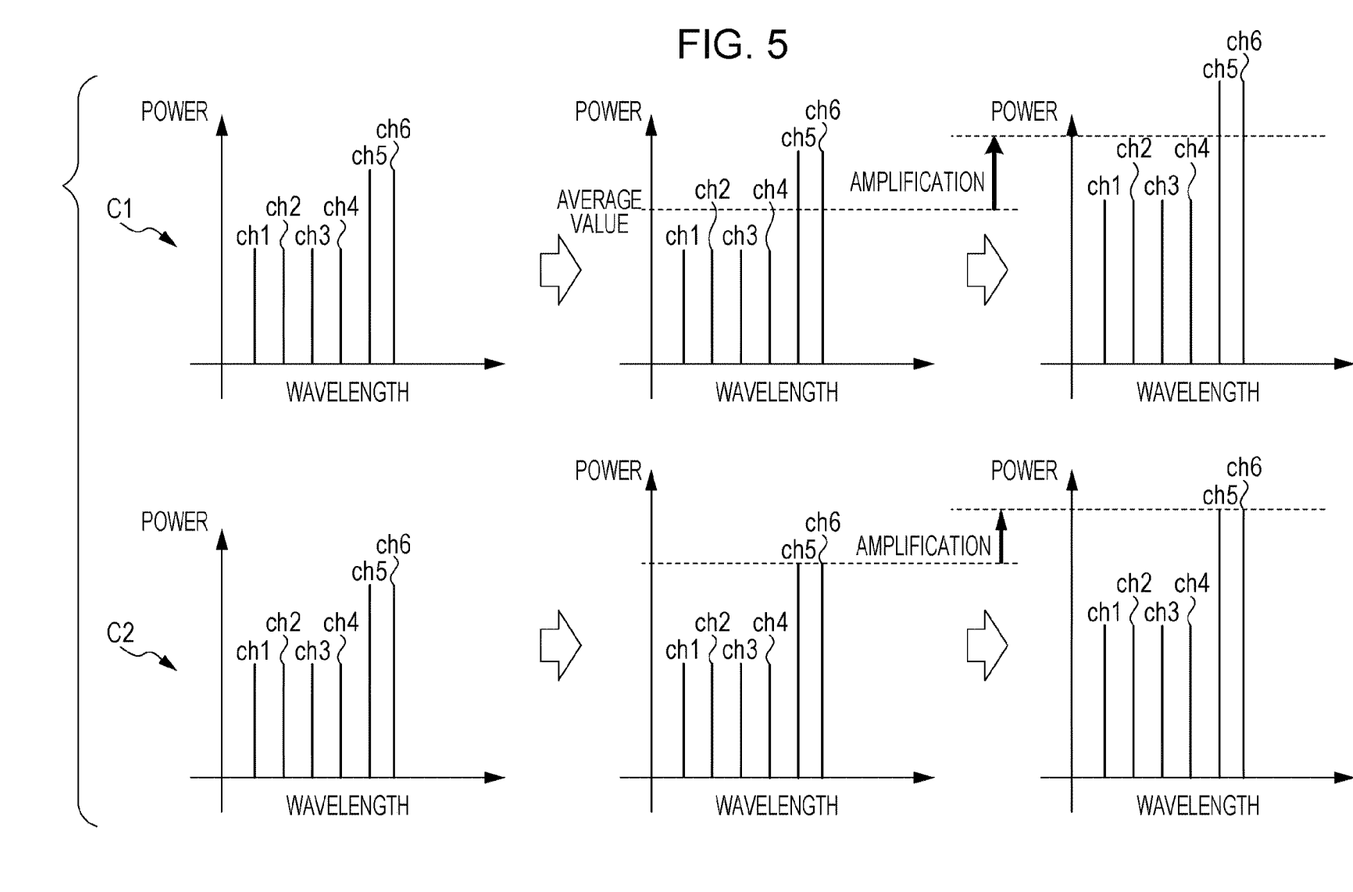
FIG. 5 is a diagram illustrating a comparative example of amplification of signal lights.

FIG. 5 is a diagram illustrating a comparative example of amplification of signal lights. In FIG. 5, a case C1 indicates that amplification is performed based on an average value of the power values of signal lights (ch1 to c6), and a case C2 indicates that amplification is performed in accordance with the power values of the signal lights having the high power level (ch5 and ch6).

As illustrated in FIG. 5, in the case C1, the amplification is performed based on the average value, and, as a result, the signal lights having the high power level (ch5 and ch6) might be excessively amplified, and the signal lights are affected by the non-linear effect significantly in the optical transmission path 14b, and signal degradation occurs. However, in the case C2, the amplification is performed so that the power values of the signal lights having the high power level (ch5 and ch6) are set as a target power value that has been set in advance within a range in which the power values are not significantly affected by the non-linear effect. Thus, in the case C2, signal degradation due to the non-linear effect may be reduced for the signal lights having the high power level (ch5 and ch6).

Modification 1

In the above-described first embodiment, the example is described in which the amplification is performed in accordance with the power values of the signal lights having the high power level, which are included in the multiplexed light. In a modification 1, an example is described below in which amplification is performed in accordance with the power values of signal lights having a low power level.

For a short-medium distance and/or large capacity transmission network such as a metro network, a maximum increase in an optical signal-to-noise ratio (OSNR) may be desired rather than a reduction in signal degradation due to the non-linear effect. As described above, in the optical transmission device 1 in the short-medium distance and/or large capacity transmission network, by noticing the power value of a signal light having a low power level, amplification is performed so that the power value is set as a certain target power value. As a result, the optical transmission device 1 may avoid degradation of an OSNR of the signal light having the low power level.

Figure 12:
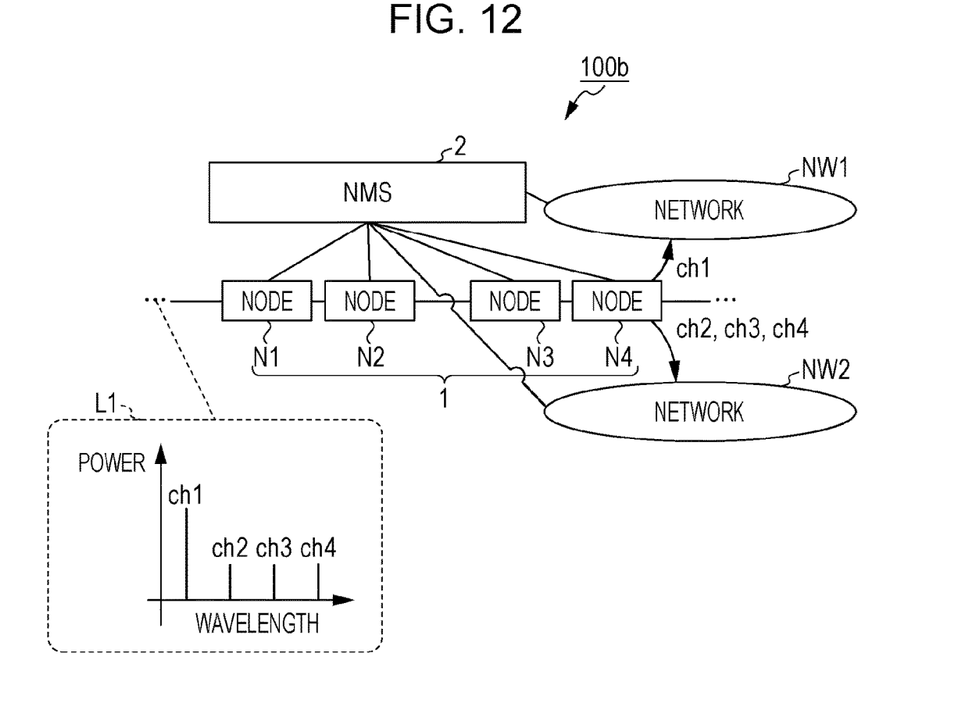
FIG. 12 is a block diagram illustrating a configuration example of an optical transmission system according to a third embodiment.

Switching whether the optical transmission device 1 performs amplification in accordance with the power value of a signal light having a high power level or the power value of a signal light having a low power level may be performed based on setting of a console (not illustrated) or a network management system (NMS) 2 (see FIG. 12). For example, the optical transmission device 1 in the short-medium distance and/or large capacity transmission network may be set so that amplification is performed in accordance with the power value of a signal light having a low power level. In addition, the optical transmission device 1 in the long-distance transmission network may be set so that amplification is performed in accordance with the power value of a signal light having a high power level.

The configuration and the operation example of the optical transmission device 1 according to the modification 1 are similar to those of FIGS. 1 and 2. In the modification 1, a control unit 124 calculates a gain setting value that corresponds to a signal light having a low power level from among signal lights included in a multiplexed light to which wavelength multiplexing has been applied, based on notified monitor values, in processing similar to that of S3 of FIG. 2. For example, the control unit 124 calculates a gain setting value so that the power value of a signal light having a low power level is set as a target power value that has been set in the memory or the like in advance.

Figure 6:
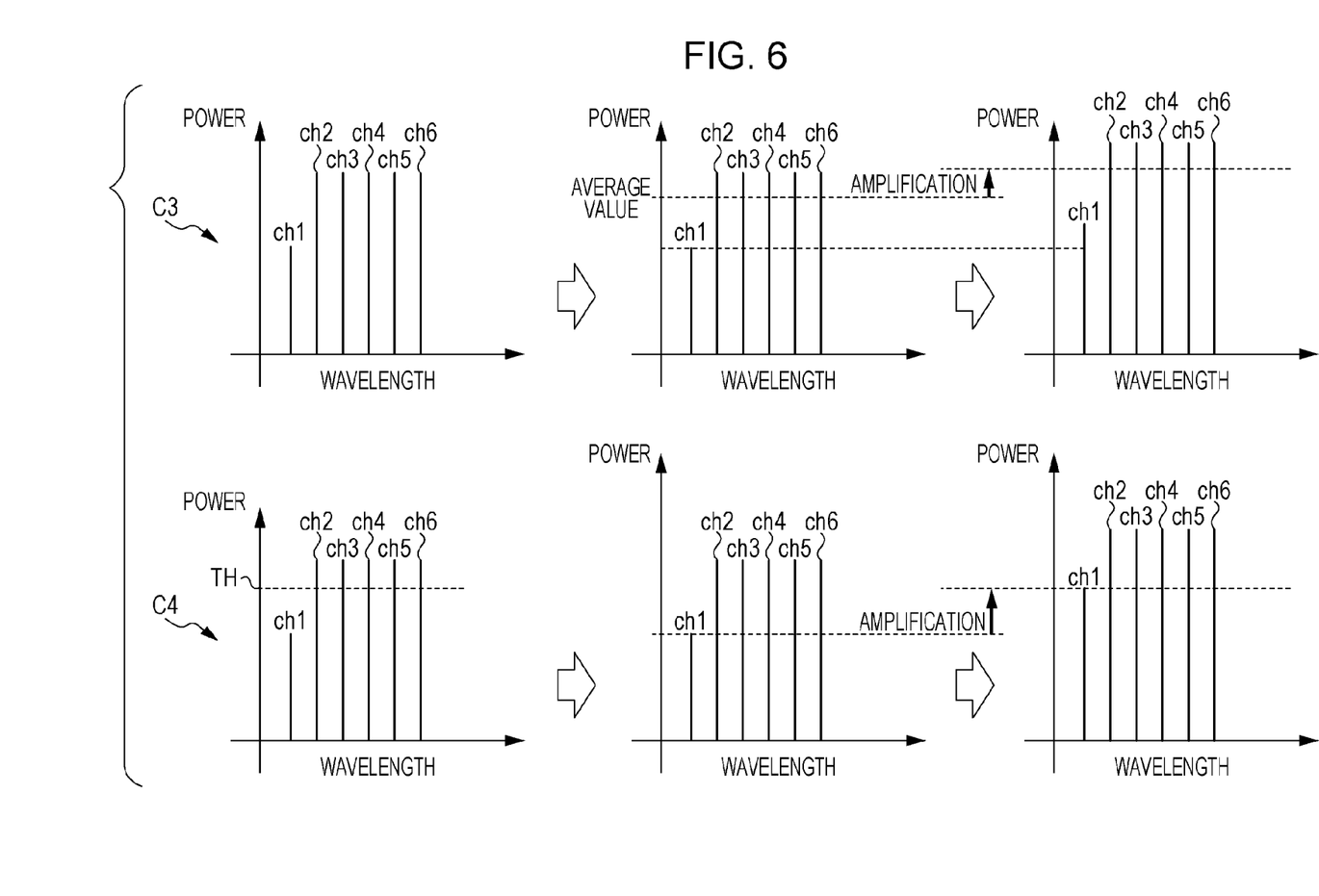
FIG. 6 is a diagram illustrating amplification of signal lights in a modification 1.

FIG. 6 is a diagram illustrating amplification of signal lights in the modification 1. In FIG. 6, a case C3 indicates that amplification is performed based on an average value of the power values of signal lights (ch1 to c6), and a case C4 indicates that amplification is performed in accordance with the power value of the signal light having the low power level (ch1).

As illustrated in FIG. 6, in the case C3, the amplification is performed based on the average value, so that amplification of the signal light having the low power level (ch1) is small, and degradation of the OSNR in the signal light ch1 may not be ignored. However, in the case C4, the amplification is performed in accordance with the power value of the signal light having the low power level (ch1) to the extent that the OSNR of each of the signal lights may be sufficiently increased. Thus, in the case C4, degradation of the OSNR in each of the signal lights may be reduced, and for example, degradation of the OSNR of the signal light having the low power level (ch1) may be reduced.

Second Embodiment

In a second embodiment, an example of a configuration is described in which a multiplexed light in an EDFA is amplified based on monitoring information from an optical performance monitor (OPM) that monitors OSNRs of input signal lights. For example, each node includes an OPM that monitors an OSNR of each of the signal lights in the input multiplexed light, and transmits the values of the OSNRs of the monitored signal lights to the node just before. In addition, the node that has received the values of the OSNRs amplifies the multiplexed light in the EDFA based on the values of the OSNRs.

Figure 7:
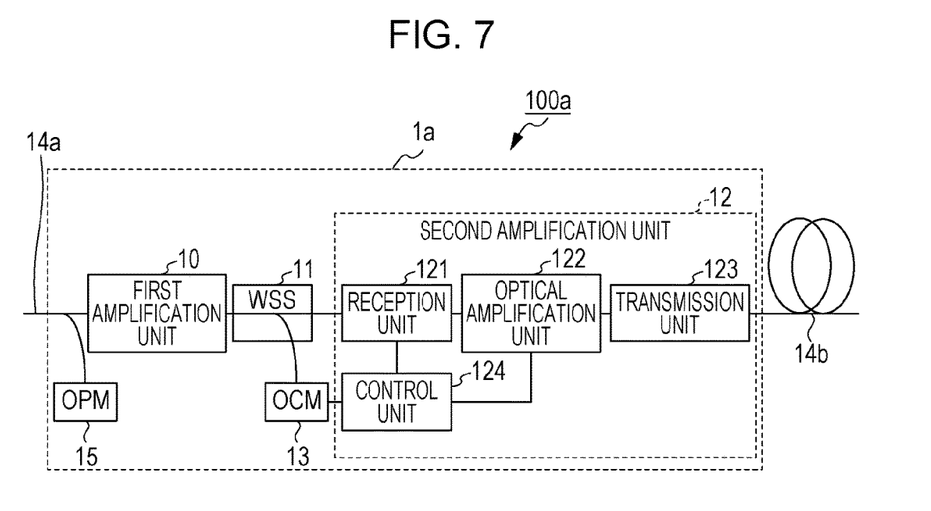
FIG. 7 is a block diagram illustrating a configuration example of an optical transmission device according to a second embodiment.

FIG. 7 is a block diagram illustrating a configuration of an optical transmission device is according to the second embodiment. As illustrated in FIG. 7, the optical transmission device is that is one of nodes in an optical transmission system 100a includes a first amplification unit 10, a WSS 11, a second amplification unit 12, an OCM 13, and an OPM 15. The OPM 15 monitors an OSNR of each signal light in the multiplexed light input from an optical transmission path 14a. The values of the OSNRs (OSNR monitor values) that have been monitored in the OPM 15 are transmitted to each node through an optical supervisory channel (OSC) or the like. For example, the OSNR monitor values are fed back to the node just before through the optical transmission path 14a.

Figure 8:
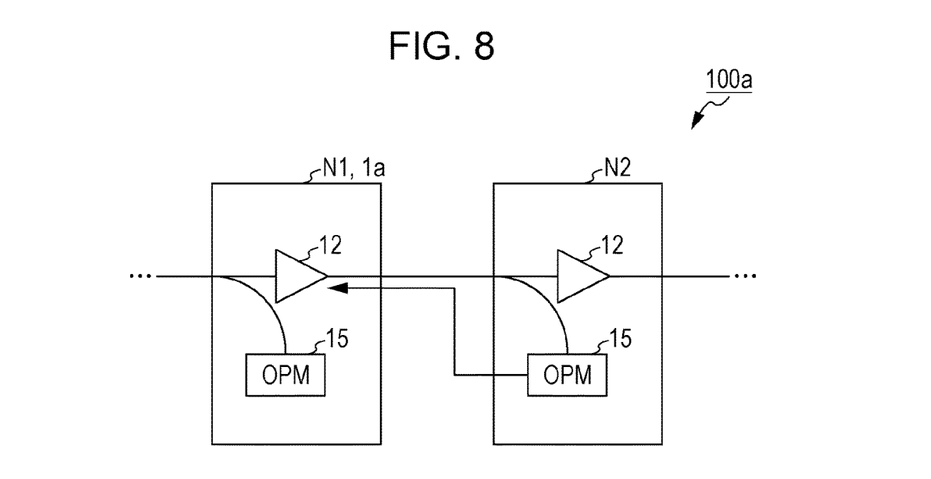
FIG. 8 is a diagram illustrating feedback of OSNR monitor values.

FIG. 8 is a diagram illustrating feedback of OSNR monitor values. As illustrated in FIG. 8, OSNR monitor values that have been monitored in an OPM 15 of a node N2 are fed back to a node N1. A second amplification unit 12 of the node N1 amplifies the multiplexed light based on the OSNR monitor values that have been fed back from the node N2.

Figure 9:
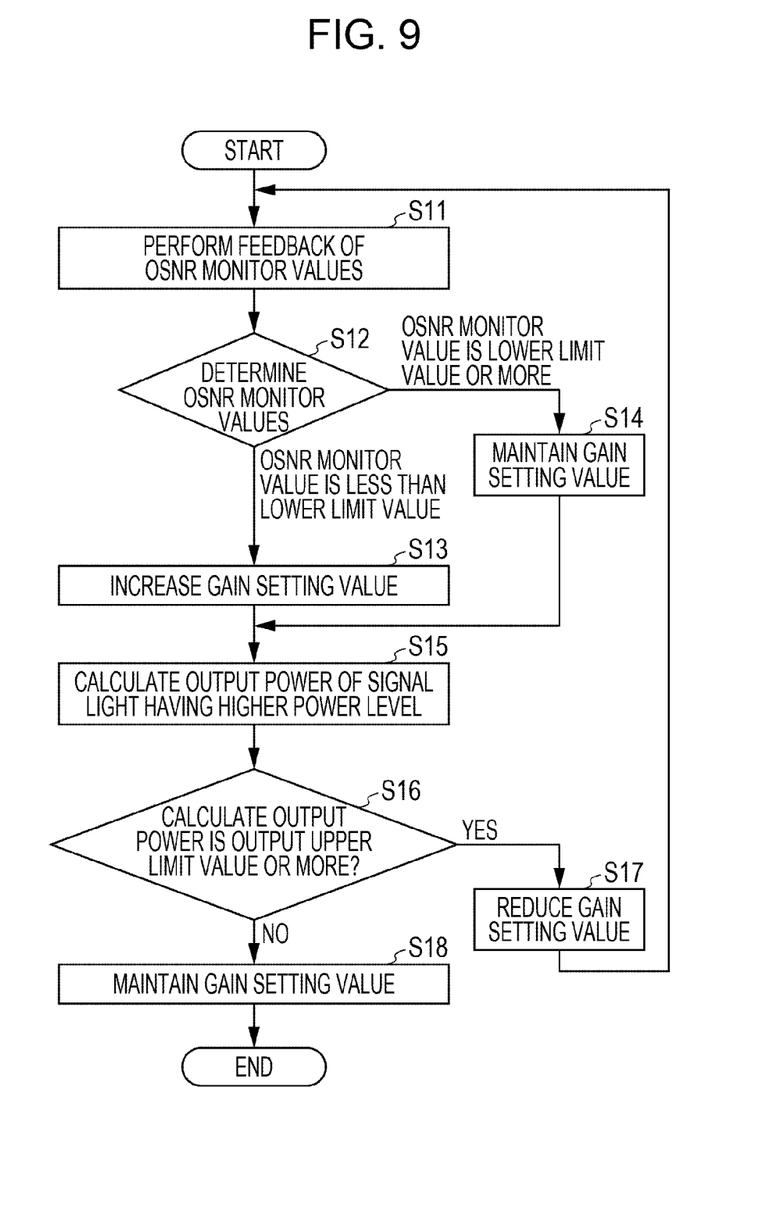
FIG. 9 is a flowchart illustrating an operation example of the optical transmission device according to the second embodiment.

FIG. 9 is a flowchart illustrating an operation example of the optical transmission device is according to the second embodiment. As illustrated in FIG. 9, a control unit 124 of the second amplification unit 12 receives OSNR monitor values that have been fed from the next node (N2) (S11), and determines the OSNR monitor values (S12). For example, the control unit 124 determines whether or not the OSNR monitor values are a lower limit value for the OSNR or more, which has been set in advance. The lower limit value for the OSNR is set in a memory or the like in the control unit 124, for example, as the minimum desired value of the OSNR, which has been designed for the transmission.

When the OSNR monitor values are less than the lower limit value, the control unit 124 increases the gain setting value because the multiplexed light is amplified so that the OSNRs do not become sufficiently large (S13). In addition, when the OSNR monitor values are the lower limit value or more, the control unit 124 maintains the gain setting value because the multiplexed light has been amplified so that the OSNRs become sufficiently large (S14).

After S13 and S14, the control unit 124 calculates output power of a signal light having a higher power level, from among the signal lights (S15). For example, the control unit 124 calculates the output power by adding the current gain setting value to the input power of the signal light having the high power level in the monitor values that have been notified from the OCM 13.

After that, the control unit 124 determines whether or not the calculated output power is an output upper limit value or more, which has been set in advance (S16). Such an output upper limit value is set in the memory or the like of the control unit 124 in advance, for example, as an upper limit value of output power from which an influence from the non-linear effect starts to appear.

When the calculated output power is the output upper limit value or more (S16: YES), the control unit 124 reduces the gain setting value because an influence due to the non-linear effect starts to appear (S17), and the flow returns to the processing of S11. In addition, when the calculated output power is less than the output upper limit value (S16: NO), the control unit 124 maintains the gain setting value because there is no influence from a non-linear effect (S18), and the processing ends.

Figure 10:
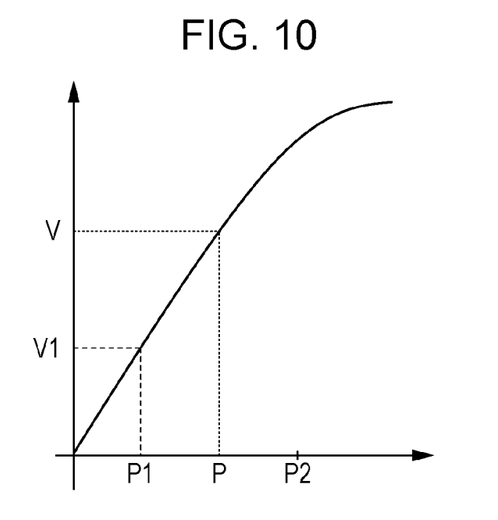
FIG. 10 is a diagram illustrating a relationship between an OSNR monitor value and output power.

FIG. 10 is a diagram illustrating a relationship between an OSNR monitor value and output power. The vertical axis in FIG. 10 indicates the value of an OSNR, and the horizontal axis indicates output power in a multiplexed light, and "P" indicates output power, and "V" indicates the value of an OSNR that corresponds to the output power. In addition, "V1" indicates a lower limit value of an OSNR, and "P1" indicates output power that corresponds to the lower limit value of the OSNR. In addition, "P2" indicates an output upper limit of output power from which an influence due to the non-linear effect starts to appear.

As illustrated in FIG. 10, when an OSNR monitor value (V) is a lower limit value (V1) or more, the gain setting value is maintained, and the output power (P) is also maintained. In addition, when the OSNR monitor value (V) is less than the lower limit value (V1), the gain setting value is increased. As a result, the output power (P) is controlled so as to become the output power (P1) or more, which corresponds to the lower limit value.

Figure 11:
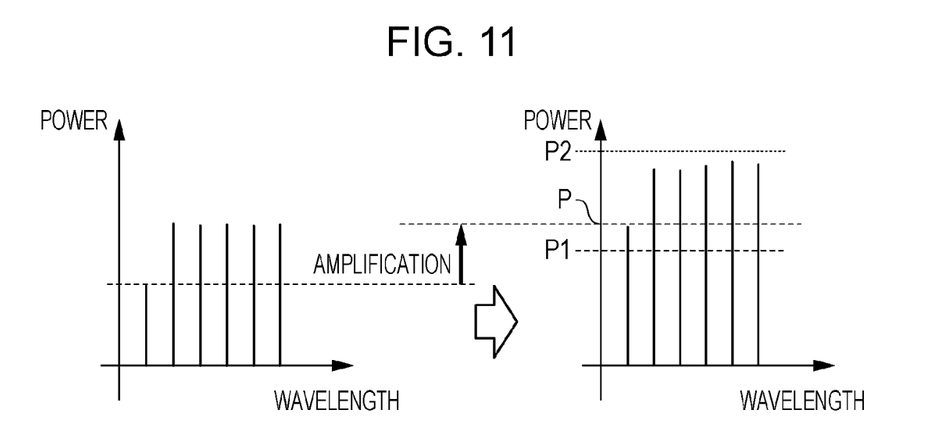
FIG. 11 is a diagram illustrating amplification of signal lights in the second embodiment.

FIG. 11 is a diagram illustrating amplification of signal lights in the second embodiment. As illustrated in FIG. 11, in the above-described flowchart (S11 to S18), the power of each of the signal lights in the multiplexed light is amplified so as to become the lower limit value (P1) or more, and less than the output upper limit value (P2). Thus, in the optical transmission device 1a, the OSNR is sufficiently increased for each of the signal lights in the amplified multiplexed light, without influence from a non-linear effect, so that signal degradation may be reduced.

Third Embodiment

In a third embodiment, an example of a configuration is described in which an NMS sets a control method of amplification in accordance with the power value of a signal light having a high power level or the power value of a signal light having a low power level for each node (optical transmission device 1) that constitutes a network.

FIG. 12 is a block diagram illustrating a configuration example of an optical transmission system 100b according to the third embodiment. As illustrated in FIG. 12, in the optical transmission system 100b, an NMS 2 performs setting for the nodes N1 to N4. For example, the NMS 2 is a device that performs various setting for the nodes N1 to N4, and nodes in networks NW1 and NW2. For example, the NMS 2 performs various setting based on a command that has been input by a user in a personal computer or a workstation. It is assumed that the optical transmission device 1 similar to that of the above-described first embodiment is used for each of the nodes such as the nodes N1 to N4.

Here, the NMS 2 sets the control method of amplification in accordance with the power value of a signal light having a high power level or the power value of a signal light having a low power level. Such setting of the control method is performed in accordance with a transmission distance based on design information of a network, in which a transmission distance between nodes (path distance), a transmission path of each of the signal lights (ch1 to ch4), and the like are described.

For example, it is assumed that the network NW1 is constituted by long-distance transmission sections, and the signal light ch1 is transmitted through the network NW1. In addition, it is assumed that the network NW2 is constituted by short-distance transmission sections, and the signal lights ch2 to ch4 are transmitted through the network NW2. In addition, multiplexed light L1 of the signal lights ch1 to ch4 is transmitted to the nodes N1 to N4.

Based on the design information, the NMS 2 sets the control method of amplification in accordance with the power value of a signal light having a high power level, for the network NW1 constituted by the long-distance transmission sections, and the nodes N1 to N4 that perform transmission of the signal light (ch1) for long-distance transmission. In addition, the NMS 2 sets the control method of amplification in accordance with the power value of a signal light having a low power level, for the network NW2 constituted by the short-distance transmission sections.

Figure 13:
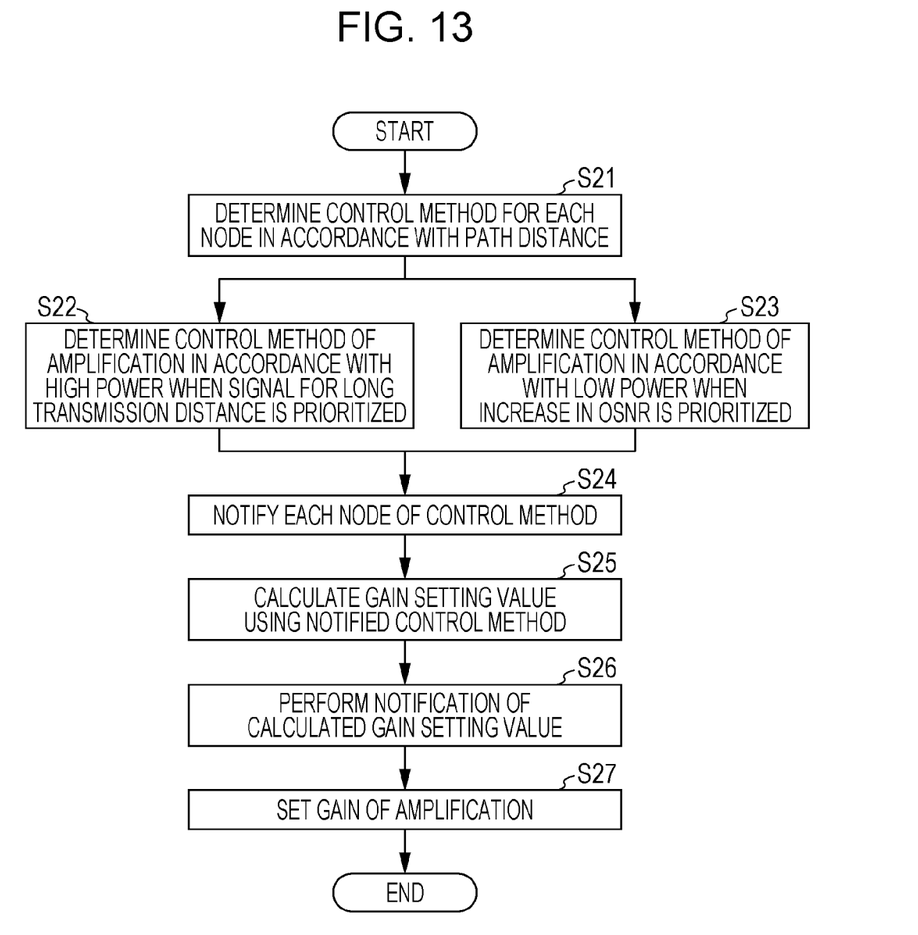
FIG. 13 is a flowchart illustrating an operation example of the optical transmission system according to the third embodiment.

FIG. 13 is a flowchart illustrating an operation example of the optical transmission system 100b according to the third embodiment. As illustrated in FIG. 13, when the processing starts, the NMS 2 determines a control method for each of the nodes, in accordance with a path distance described in the design information (S21).

For example, the NMS 2 determines a control method of amplification is performed in accordance with high power from among the signal lights, for a node that performs transmission of the signal light (ch1) for long-distance transmission, that is, for a case in which a signal for long-distance transmission is prioritized (S22). In addition, the NMS 2 determines a control method of amplification in accordance with low power from among the signal lights (S23) for a node that does not perform transmission of the signal light (ch1) for long-distance transmission (nodes in the network NW2), that is, for a case in which an increase in an OSNR is prioritized.

After that, the NMS 2 notifies each of the nodes of the control method that has been determined in S22 or S23 (S24). In each of the nodes, the control unit 124 calculates a gain setting value using the notified control method (S25). After that, the control unit 124 notifies the optical amplification unit 122 of the calculated gain setting value (S26), and sets gain of amplification of the multiplexed light in the optical amplification unit 122 (S27).

Modification 2

In a modification 2, as a modification of the third embodiment, an example of a configuration is described in which a power difference is assigned, in advance, between a signal light for long-distance transmission and a signal light for short-distance transmission, and transmission of the signal lights is performed. As described above, a power difference is assigned, in advance, between the signal light for long-distance transmission and the signal light for short-distance transmission, and in a node in which the wavelengths of the signal lights are combined, and the subsequent nodes, the control method of amplification in accordance with a signal light having a high power level is employed. Therefore, it may be avoided that the signal light for long-distance transmission is amplified to excessively high power, and that signal degradation occurs due to the non-linear effect.

Figure 14:
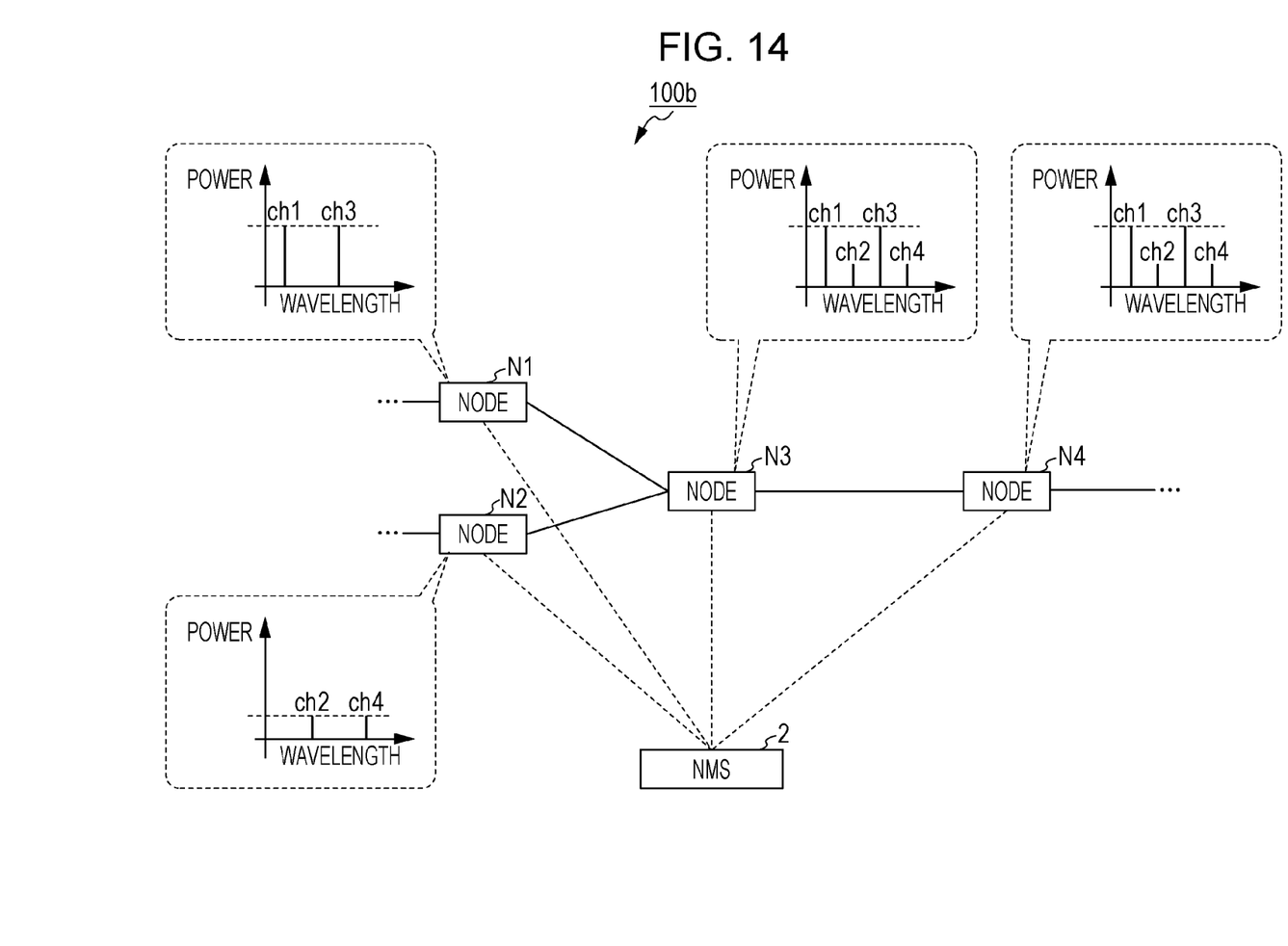
FIG. 14 is a block diagram illustrating an operation example of an optical transmission system according to a modification 2.

FIG. 14 is a diagram illustrating an operation example of an optical transmission system 100b according to the modification 2. In FIG. 14, it is assumed that signal lights ch1 and ch3 are signal lights for long-distance transmission, and signal lights ch2 and ch4 are signal lights for short-distance transmission. In addition, the signal lights ch1 and ch3 are transmitted from a node N1 to a node N3, and the signal lights ch2 and ch4 are transmitted from a node N2 to a node N3. In addition, it is assumed that the signal lights ch1 to ch4 are multiplexed in the nodes N3 and N4, and the signal lights ch1 to ch4 are transmitted as a multiplexed light. In addition, it is assumed that an optical transmission device 1 similar to that of the above-described first embodiment is used for the nodes such as the nodes N1 to N4.

Based on the design information, the NMS 2 performs setting so that power is greatly amplified, for the node N1 that performs transmission of the signal lights (ch1 an ch3) for long-distance transmission, within a range in which the power becomes less than an output upper limit value (P2) that has been set in advance. In addition, based on the design information, the NMS 2 performs setting so that power is amplified, for the node N2 that performs transmission of the signal lights (ch2 and ch4) for short-distance transmission, within a range in which the power becomes the lower limit value (P1) for the OSNR or more. Therefore, the signal lights (ch1 and ch3) for long-distance transmission and the signal lights (ch2 and ch4) for short-distance transmission are input to the node N3 in a state in which a power difference has been assigned between the signal lights for long-distance transmission and the signal lights for short-distance transmission in advance.

Based on the design information, the NMS 2 sets the control method of amplification in accordance with a signal light having a high power level, for the nodes N3 and N4 that perform transmission of the multiplexed light of the signal lights ch1 to ch4. Therefore, in the nodes N3 and N4, it may be avoided that the signal lights for long-distance transmission are amplified to excessive high power, and that signal degradation occurs due to the non-linear effect.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission device comprising:
memory; and
a processor coupled to the memory and configured to:
receive a first signal light and a second signal light, the first signal light and the second signal light having power levels that correspond to transmission distances;
receive monitoring information of optical signal-to-noise ratios (OSNRs) of the first signal light and the second signal light;
amplify the first signal light and the second signal light in accordance with a signal light having a high power level;
increase a gain value of the amplification of the first signal light and the second signal light when the OSNR is less than a certain lower limit value; and
transmit the amplified first signal light and the amplified second signal light.

2. The optical transmission device according to claim 1:
wherein the monitoring information of the first signal light and the second signal light is received from a second optical transmission device that receives the first signal light and the second signal light, and
the processor being further configured to amplify the first signal light and the second signal light, in accordance with the signal light having the high power level, based on the received monitoring information.

3. The optical transmission device according to claim 2, wherein the processor is further configured to:
reduce the gain value when an amplified power of the signal light having the high power level, which is calculated based on the gain value, is a certain upper limit value or more.

4. An optical transmission device comprising:
memory; and
a processor coupled to the memory and configured to:
receive a wavelength multiplexed light with a first signal light and a second signal light, the first signal light and the second signal light having power levels that correspond to transmission distances;
receive monitoring information of optical signal-to-noise ratios (OSNRs) of the first signal light and the second signal light;
amplify the received wavelength multiplexed light in accordance with a signal light having a high power level;
increase a gain value of the amplification of the first signal light and the second signal light when the OSNR is less than a certain lower limit value; and
transmit the amplified wavelength multiplexed light.

5. The optical transmission device according to claim 4, wherein the monitoring information of the wavelength multiplexed light is received from a second optical transmission device that receives the wavelength multiplexed light, and
the processor being further configured to amplify the wavelength multiplexed light in accordance with the signal light of the wavelength having the high power level, based on the received monitoring information.

6. The optical transmission device according to claim 5, wherein the processor is further configured to:
reduce the gain value when amplified power of the signal light of the wavelength having the high power level, which is calculated based on the gain value, is a certain upper limit value or more.

7. An optical transmission system comprising:
an optical transmission device that transmits signal lights through a transmission path, the optical transmission device including:
memory; and
a processor coupled to the memory and configured to:
receive a first signal light and a second signal light, the first second light and the second signal light having power levels that correspond to transmission distances,
receive monitoring information of optical signal-to-noise ratios (OSNRs) of the first signal light and the second signal light;
amplify the first signal light and the second signal light in accordance a signal light having a high power level;
increase a gain value of the amplification of the first signal light and the second signal light when the OSNR is less than a certain lower limit value; and
transmit the amplified first signal light and second signal light.

* * * * *